United States Patent
Muthiah (10) Patent No.: US 11,546,612 B2
(45) Date of Patent: Jan. 3, 2023

(54) DATA STORAGE DEVICE AND METHOD FOR APPLICATION-DEFINED DATA RETRIEVAL IN SURVEILLANCE SYSTEMS

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/336,603

(22) Filed: Jun. 2, 2021

(65) Prior Publication Data

US 2022/0394276 A1    Dec. 8, 2022

(51) Int. Cl.
| | |
|---|---|
| *H04N 19/172* | (2014.01) |
| *H04N 19/61* | (2014.01) |
| *H04N 21/845* | (2011.01) |
| *H04N 21/218* | (2011.01) |
| *H04N 21/472* | (2011.01) |
| *H04N 21/60* | (2011.01) |

(52) U.S. Cl.
CPC ........... *H04N 19/172* (2014.11); *H04N 19/61* (2014.11); *H04N 21/21805* (2013.01); *H04N 21/8455* (2013.01); *H04N 21/8456* (2013.01); *H04N 21/472* (2013.01); *H04N 21/60* (2013.01)

(58) Field of Classification Search
CPC .................. H04N 19/172; H04N 19/61; H04N 21/21805; H04N 21/8455; H04N 21/8456; H04N 21/472; H04N 21/60
See application file for complete search history.

(56) References Cited

U.S. PATENT DOCUMENTS

| | | | | |
|---|---|---|---|---|
| 7,024,100 | B1 * | 4/2006 | Furuyama | H04N 9/8042 386/337 |
| 7,120,924 | B1 * | 10/2006 | Katcher | H04N 21/8543 375/E7.008 |
| 7,730,515 | B1 * | 6/2010 | MacCormack | H04N 21/434 725/100 |
| 7,823,174 | B2 | 10/2010 | Candelore et al. | |
| 8,848,792 | B2 | 9/2014 | MacInnis et al. | |
| 9,204,107 | B2 | 12/2015 | Yin et al. | |
| 10,841,645 | B1 * | 11/2020 | Muthiah | H04N 21/4335 |

(Continued)

FOREIGN PATENT DOCUMENTS

GB      2362284 A      11/2001

OTHER PUBLICATIONS

"MPEG transport stream"; Wikipedia entry; downloaded from the Internet at https://en.wikipedia.org/wiki/MPEG_transport_stream on Apr. 5, 2021; 6 pages.

(Continued)

*Primary Examiner* — Richard T Torrente
(74) *Attorney, Agent, or Firm* — Crowell & Moring LLP (57) ABSTRACT

A data storage device and method for application-defined data retrieval in surveillance systems are provided. In one embodiment, a data storage device is provided comprising a memory and a controller. The controller is configured to store, in the memory, a stream that combines data from a plurality of receivers; receive a request from a host for data generated by a selected receiver; extract, from the stored stream, the data generated by the selected receiver; and send the extracted data to the host. Other embodiments are provided.

20 Claims, 6 Drawing Sheets

(56) References Cited

U.S. PATENT DOCUMENTS

| | | | |
|---|---|---|---|
| 2002/0038257 A1* | 3/2002 | Joseph | G06Q 30/0641 |
| | | | 705/26.81 |
| 2010/0063880 A1 | 3/2010 | Atsmon et al. | |
| 2011/0164121 A1* | 7/2011 | Ikeda | G11B 27/105 |
| | | | 348/51 |
| 2016/0134945 A1* | 5/2016 | Gower | H04N 21/6587 |
| | | | 725/88 |
| 2016/0182249 A1 | 6/2016 | Lea | |
| 2016/0232073 A1* | 8/2016 | Cook | G06F 11/3065 |
| 2019/0347915 A1 | 11/2019 | Lai | |

OTHER PUBLICATIONS

U.S. Appl. No. 16/818,452, filed Mar. 13, 2020, entitled "Storage System and Method for Improved Playback Analysis.".
U.S. Appl. No. 16/899,250, filed Jun. 11, 2020, entitled "Storage System and Method for Data Peeling,".
International Search Report dated May 12, 2022 for International Application No. PCT/US2022/013832.
Written Opinion dated May 12, 2022 for International Application No. PCT/US2022/013832.
Search Strategy completed May 10, 2022 for International Application No. PCT/US2022/013832.

\* cited by examiner

DATA STORAGE DEVICE AND METHOD FOR APPLICATION-DEFINED DATA RETRIEVAL IN SURVEILLANCE SYSTEMS

BACKGROUND

A data storage device can store data received from a plurality of receivers in a single stream in its memory. For example, the data storage device can store a stream of video data that combines video from a plurality of cameras in a surveillance system. A host can request the video stream from the data storage device for playback.

DETAILED DESCRIPTION

Overview

By way of introduction, the below embodiments relate to a data storage device and method for application-defined data retrieval in surveillance systems. In one embodiment, a data storage device is provided comprising a memory and a controller. The controller is configured to store, in the memory, a stream that combines data from a plurality of receivers; receive a request from a host for data generated by a selected receiver; extract, from the stored stream, the data generated by the selected receiver; and send the extracted data to the host.

In some embodiments, each of the plurality of receivers is associated with a different identifier, and the request from the host comprises an identifier for the selected receiver.

In some embodiments, the identifier comprises a packet identifier (PID).

In some embodiments, the controller is further configured to create at least one of a program association table or a program mapping table for the extracted data.

In some embodiments, the data comprises video data and the plurality of receivers comprise a plurality of cameras.

In some embodiments, the controller is further configured to send only instantaneous decoder refresh (IDR) frames from the extracted data to the host.

In some embodiments, the controller is further configured to: receive a request from the host for data generated by another selected receiver; extract the data generated by the another selected receiver; and send the extracted data generated by the another selected receiver to the host.

In some embodiments, the data generated by the another selected receiver is extracted from the stream.

In some embodiments, the data generated by the another selected receiver is extracted from a different stream.

In some embodiments, the extracted data generated by the selected receiver and the extracted data generated by the another selected receiver are combined into a transport stream.

In some embodiments, the controller is further configured to receive the request via an application-specific storage interface.

In some embodiments, the memory comprises a three-dimensional memory.

In another embodiment, a method is provided that is performed in a data storage device comprising a memory. The method comprises: receiving a request from a host for data generated by a selected receiver; segregating the data generated by the selected receiver out of a stream stored in the memory that comprises data generated by a plurality of receivers; and sending the segregated data to the host.

In some embodiments, the data comprises video data and the plurality of receivers comprise a plurality of cameras.

In some embodiments, the method further comprises sending only instantaneous decoder refresh (IDR) frames from the extracted data to the host.

In some embodiments, the method further comprises receiving a request from the host for data generated by another selected receiver; segregating the data generated by the another selected receiver from the stream or another stream stored in the memory; and sending the segregated data generated by the another selected receiver to the host.

In some embodiments, the method further comprises creating a transport stream with the segregated data generated by the selected receiver and the segregated data generated by the another selected receiver.

In some embodiments, each of the plurality of receivers is associated with a different identifier; and the request from the host comprises an identifier for the selected receiver.

In some embodiments, the identifier comprises a packet identifier (PID).

In another embodiment, a data storage device is provided comprising a memory; means for storing, in the memory, a stream that combines data from a plurality of receivers; means for receiving a request from a host for data generated by a selected receiver; means for extracting, from the stored stream, the data generated by the selected receiver; and means for sending the extracted data to the host.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
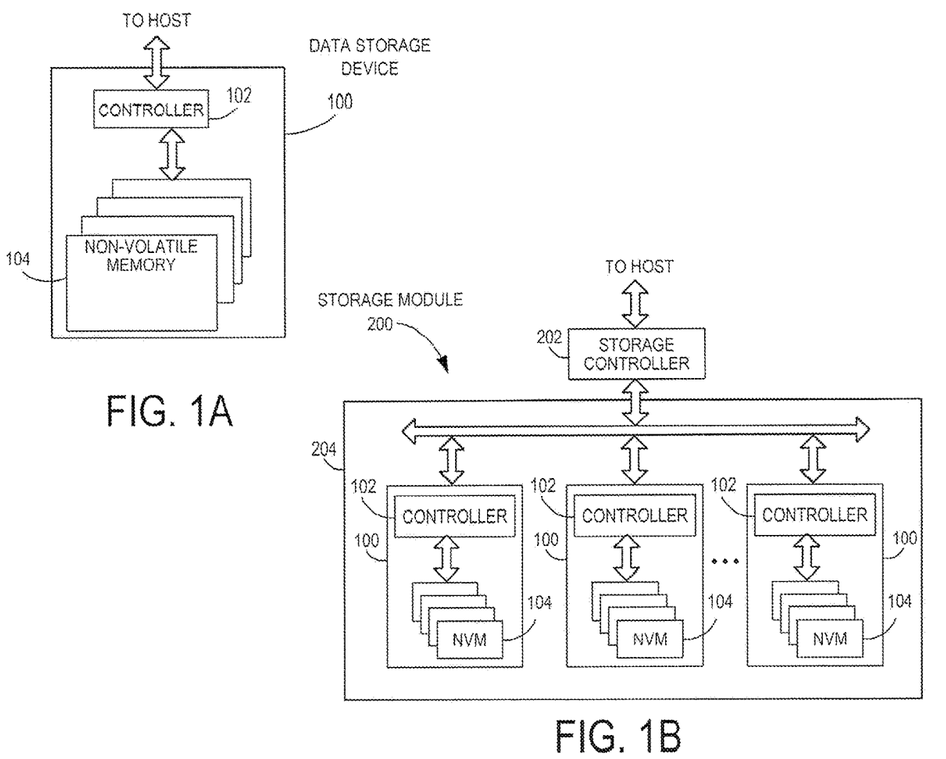
FIG. 1A is a block diagram of a data storage device of an embodiment.
FIG. 1B is a block diagram illustrating a storage module of an embodiment.
Figure 1C:
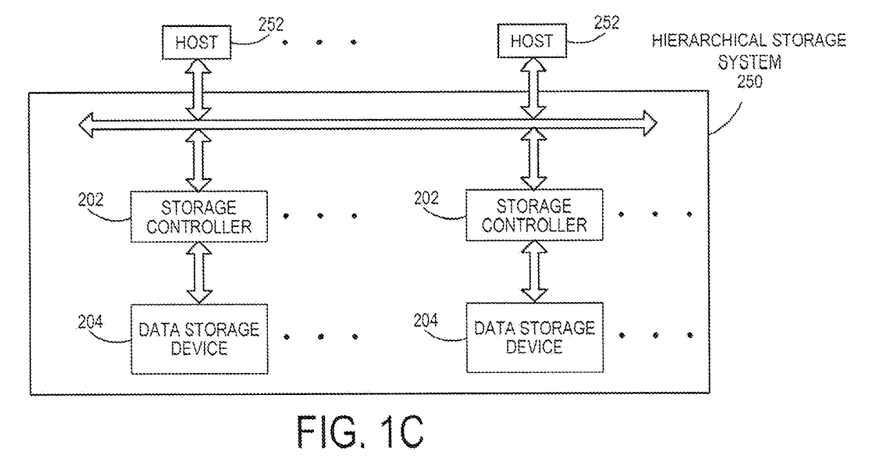
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
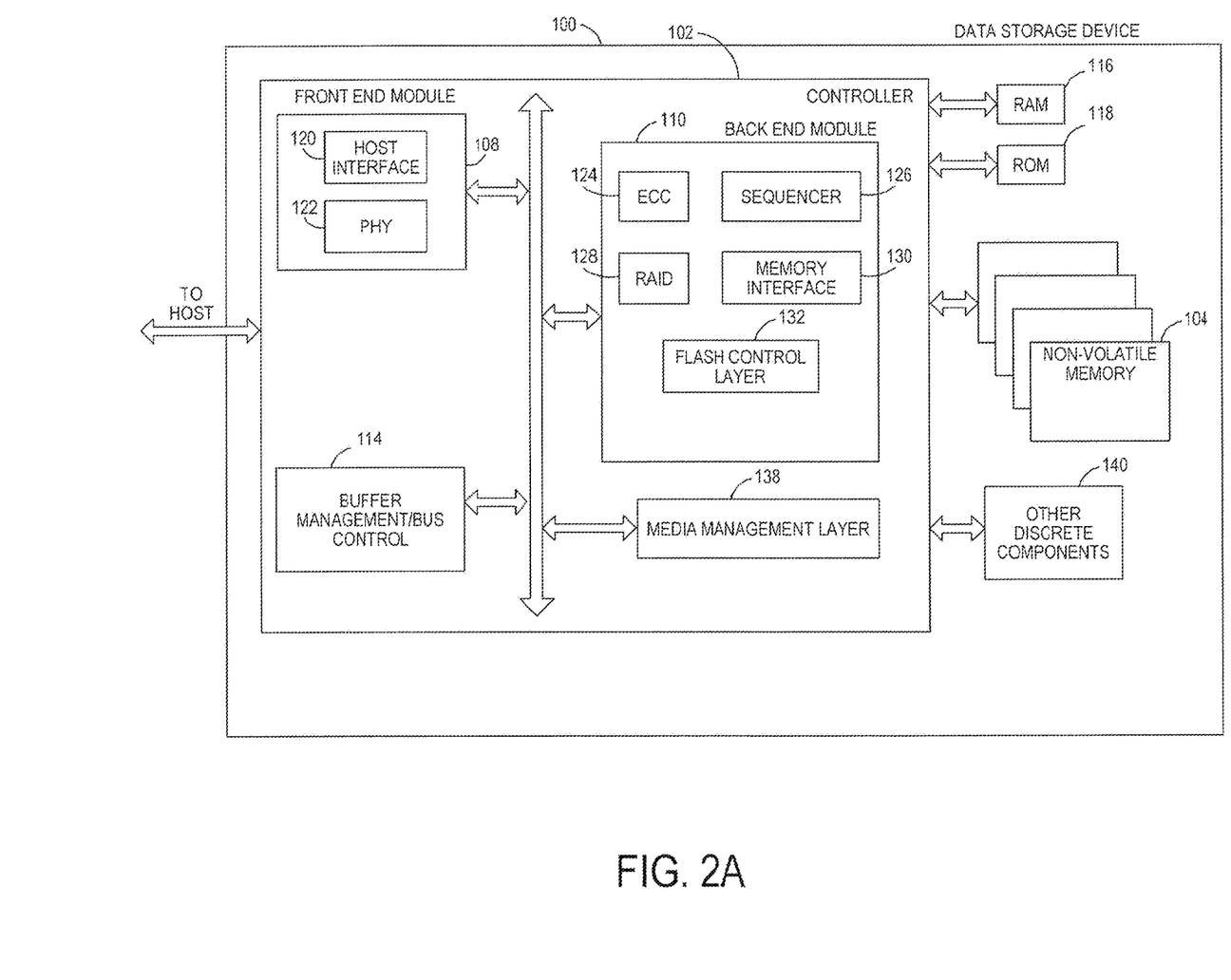
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
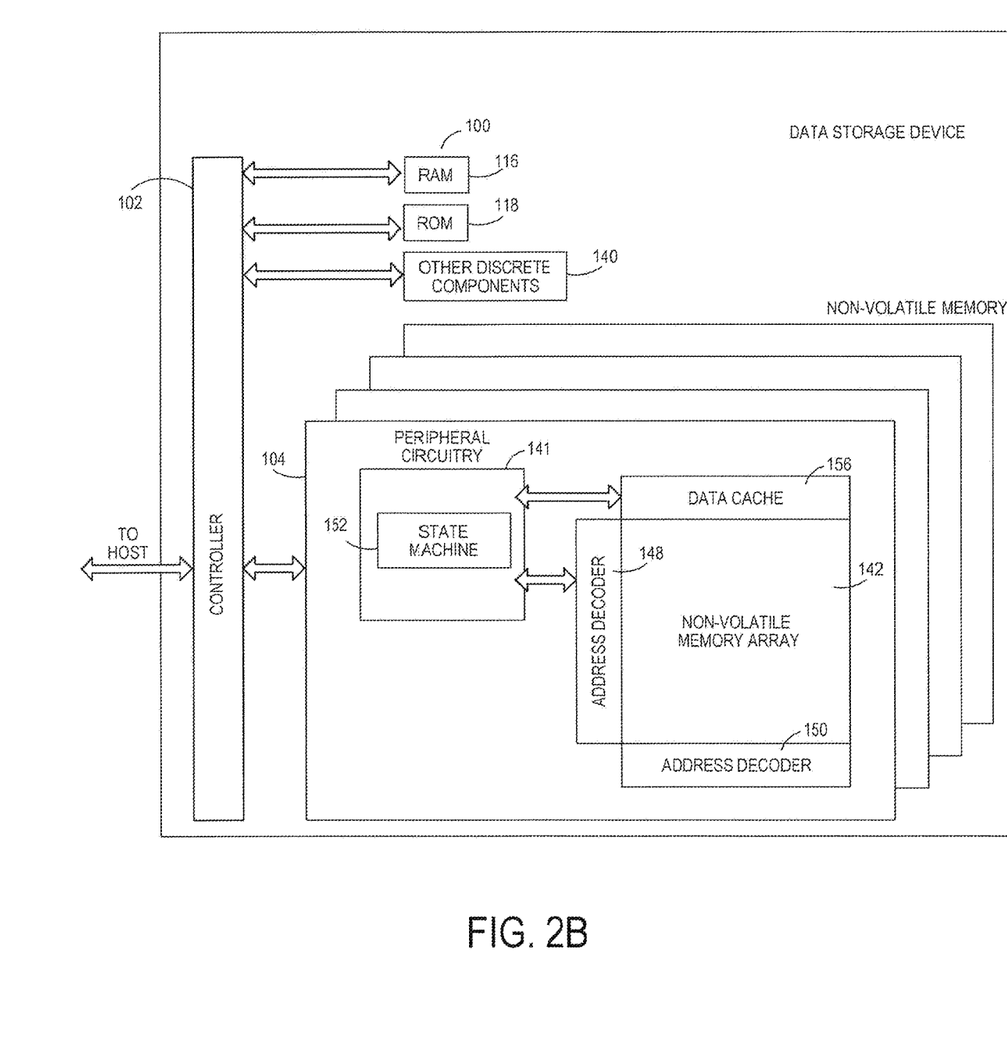
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
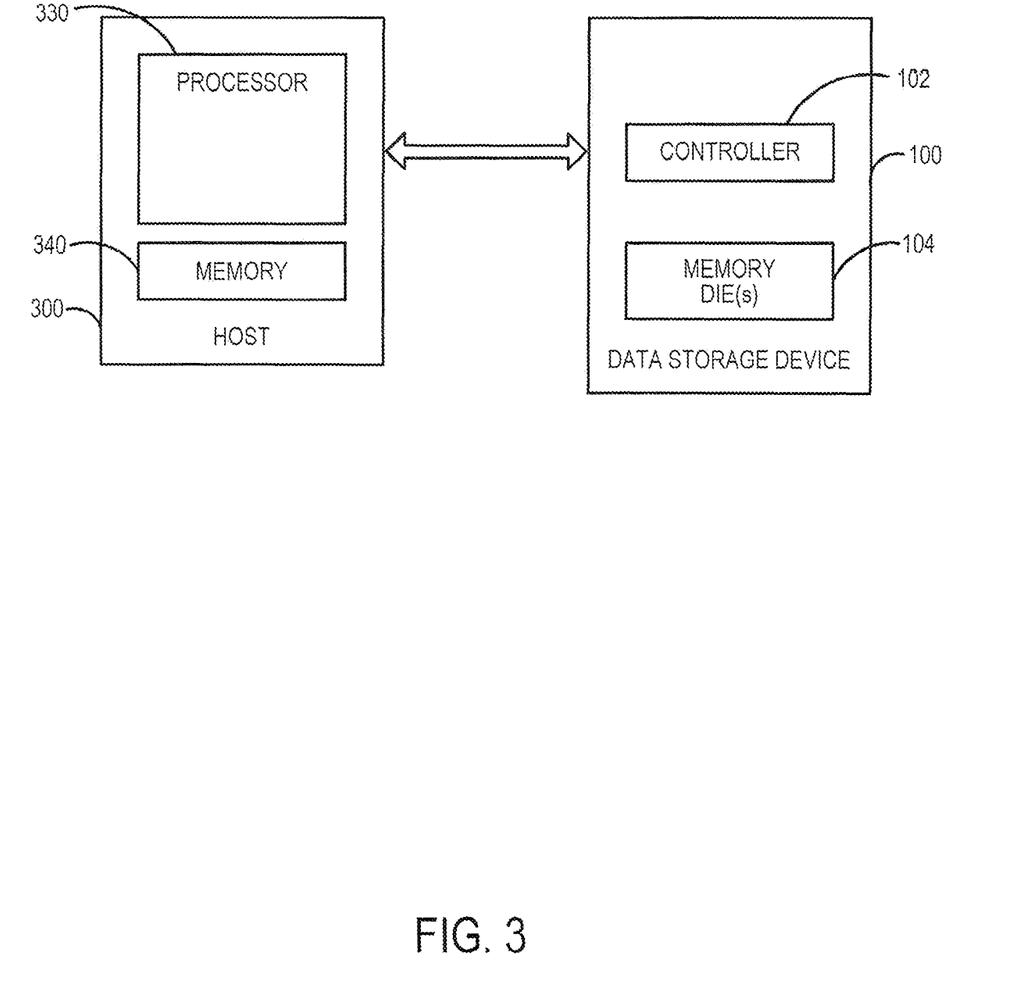
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

The data storage device 100 can store any suitable type of data. For example, the data storage device 100 can store a stream that combines data from a plurality of receivers (e.g., video data from a camera, audio data from a microphone, sensor data from a sensor, etc.). Some of the below embodiments will be illustrated in terms of a video stream that combines video (and optionally audio) data from a plurality of cameras in a surveillance system. However, it should be noted that this is merely an example and should not be read into the claims unless expressly recited therein. It should also be noted that other types of data can be used, such as audio data and sensor data, as mentioned above. In this way, these embodiments can have wide use in a variety of applications. For example, these embodiments can be used in automotive and Internet of Things (IoT) applications where multiple sensors may be sharing a common stream to write data to the data storage device 100.

In this example, the data comprises video data and can take any suitable form and is stored as a video stream of a plurality of video image frames that are in the Moving Picture Experts Group Transport Stream (MPEG-TS) format. In that format, different video frames are compressed using different compression algorithms, and such different video frames can be classified into different picture or frame types. Three of the major picture types are intra-coded picture frames (I-frames), predicted picture frames (P-frames), and bidirectional predicted picture frames (B-frames). I-frames are the least compressible but are independent in that they can be decoded without reference to other video frames. An I-frame can be a complete image, such as a Joint Photographic Experts Group (REG) image file. In contrast, a predicted picture frame (P-frame) (or delta frame) contains the changes in the image from the previous frame and requires reference to other video frames to be decompressed. However, P-frames are more compressible that I-frames. A bidirectional predicted picture frame (B-frame) contains differences between the current frame and both the preceding and following frames. Accordingly, B-frames provide the highest amount of data compression. Frames can be associated as a group of pictures (GOP), such as an intra-coded picture frames (I-frames) or instantaneous decoder refresh (IDR) frames When the data storage device 100 receives a video stream for storage, the controller 102 can use a video frame segregator to extract elementary streams (ESs) from the audio and video packed identifiers (PIDs) of each video program (i.e., the PIDs are extracted from the MPEG-TS, then the corresponding audio/video ESs are obtained from those program PIDs). To do this, the controller 102 can contain a media parser. The elementary streams are the outputs of the audio/video encoders of the cameras that contain only one kind of data (e.g., audio or video).

As mentioned above, in this example, the video stream (e.g., MPEG-TS) stored in the memory 104 of the data storage device 100 comprises multiple video programs from multiple cameras in a multi-shoot surveillance environment. However, in some situations, a host 300 may only be interested in viewing the footage of one particular camera (e.g., identified by a particular video and/or audio PID) for probing/analyzing/processing. However, because the video from all the cameras are combined into a single video stream, the entire video stream needs to be sent to the host 300 (e.g., over a network), which is not optimal. This adds to the other potential bottlenecks in a multi-channel video capture system, including camera sensor read-out speed, video compression speed, network interface speed and efficiency, storage and retrieval speeds, and decoding speed of the host/viewing station.

The following embodiments can be used to address this situation. In short, with these embodiments, the host 300 requests video data generated by a particular camera or cameras (e.g., using identifiers, such as PIDs). Instead of returning the entire video stream to the host 300, the controller 102 in the data storage device 100 extracts the relevant video from the stream and sends only that video to the host 300. That way, the host 300 only gets the video it needs, and bandwidth and processing power is not wasted on sending video that the host 300 does not need. This embodiment will be illustrated in more detail with reference to FIGS. 4 and 5.

Figure 4:
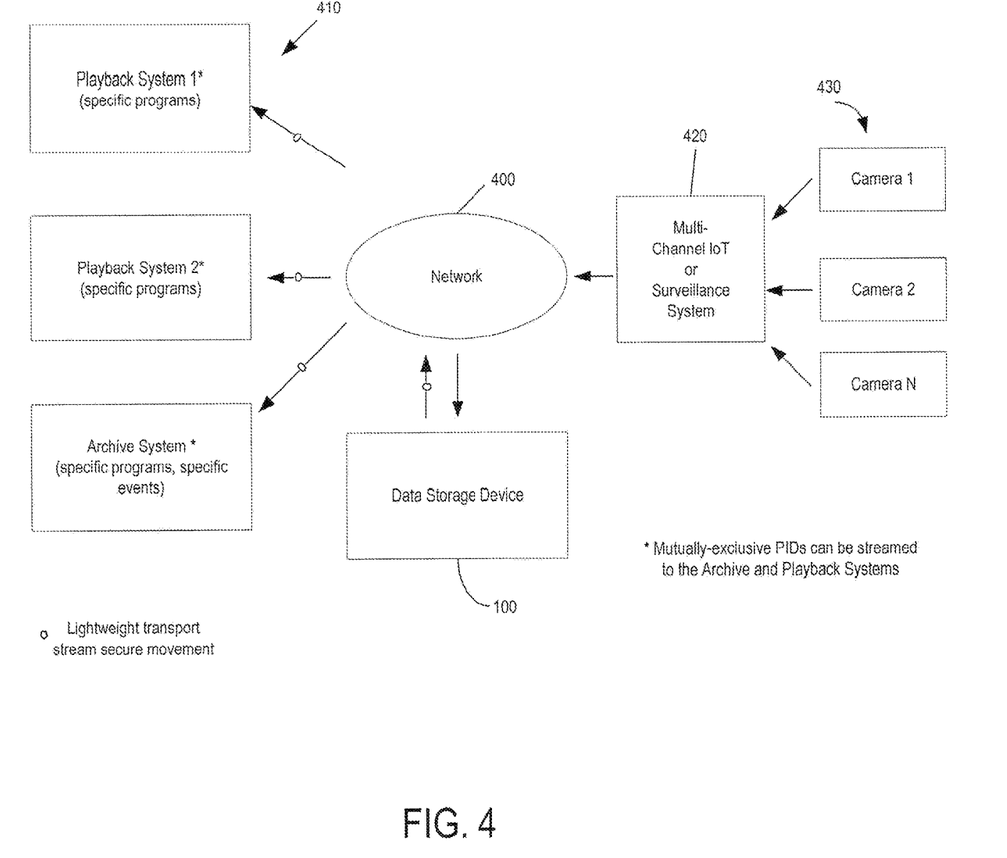
FIG. 4 is a block diagram of a network environment of an embodiment.

FIG. 4 is a block diagram of a network environment of an embodiment. As shown in FIG. 4, the data storage device 100 is in communication with a set of hosts (here, playback systems and an archive system) 410 and a multi-channel Internet of Things (IoT) or surveillance system 420 (which is connected with a set of cameras 430) via a network 400 (e.g., the Internet, local network, etc.). In operation, video (and optionally audio) captured by each of the cameras 430 is sent to the system 420, which combines the video into a single video stream (here, an MPEG-TS video steam) and sends the stream to the data storage device 100 for storage.

Each of the different hosts 410 may want a different video from the video stream of a different purpose. For example, Playback System 1 may want a video from a certain camera that covers a first location under surveillance (e.g., a rear entrance of a store), whereas Playback System 2 may want a video from a certain camera that covers a second location under surveillance (e.g., a front entrance of a store). Further, a host used as an Archive System may want video of a certain event to archive for later review. Archiving may not only be program specific, but it may also be time/event dependent. By dynamically restricting only chosen PIDs, the data rate out of the data storage device 100 can be vastly reduced, which can optimize network bandwidth and power usage.

The amount of data that can be written to the memory 104 can be considered and allowances can be made for the playback and archiving data to be transferred out of the data storage device 100. Archiving systems are systems meant for long-term storage (and not considered for phasing out PIDs). For example, consider a 32-camera shoot, each with a four megabyte per second (MB/s) constant bit rate, where the resulting data rate is 128 MB/s. In a worst-case scenario of operators viewing the same 32 programs (assuming they have enough processing power to view 32 channels), the resulting bit rate would be ~400 MB/s of data throughput to the network switch. If network overhead of at least 50 percent is added, a good one gigabyte (GB)/s network is needed for the 32 cameras in this example. The system is governed by the amount of data traffic that the network switches are capable of transferring between the cameras and the data storage device 100.

In this embodiment, a host provides an identifier to the data storage device 100 for a particular video/source (e.g., for an MPEG-TS comprising only one or a few PIDs to save network bandwidth), and the controller 102 in the data storage device 100 segregates the relevant video from the stream and returns that video (and not the other videos from the stream) to the requesting host. An example of this process is illustrated in the flow chart 500 in FIG. 5.

Figure 5:
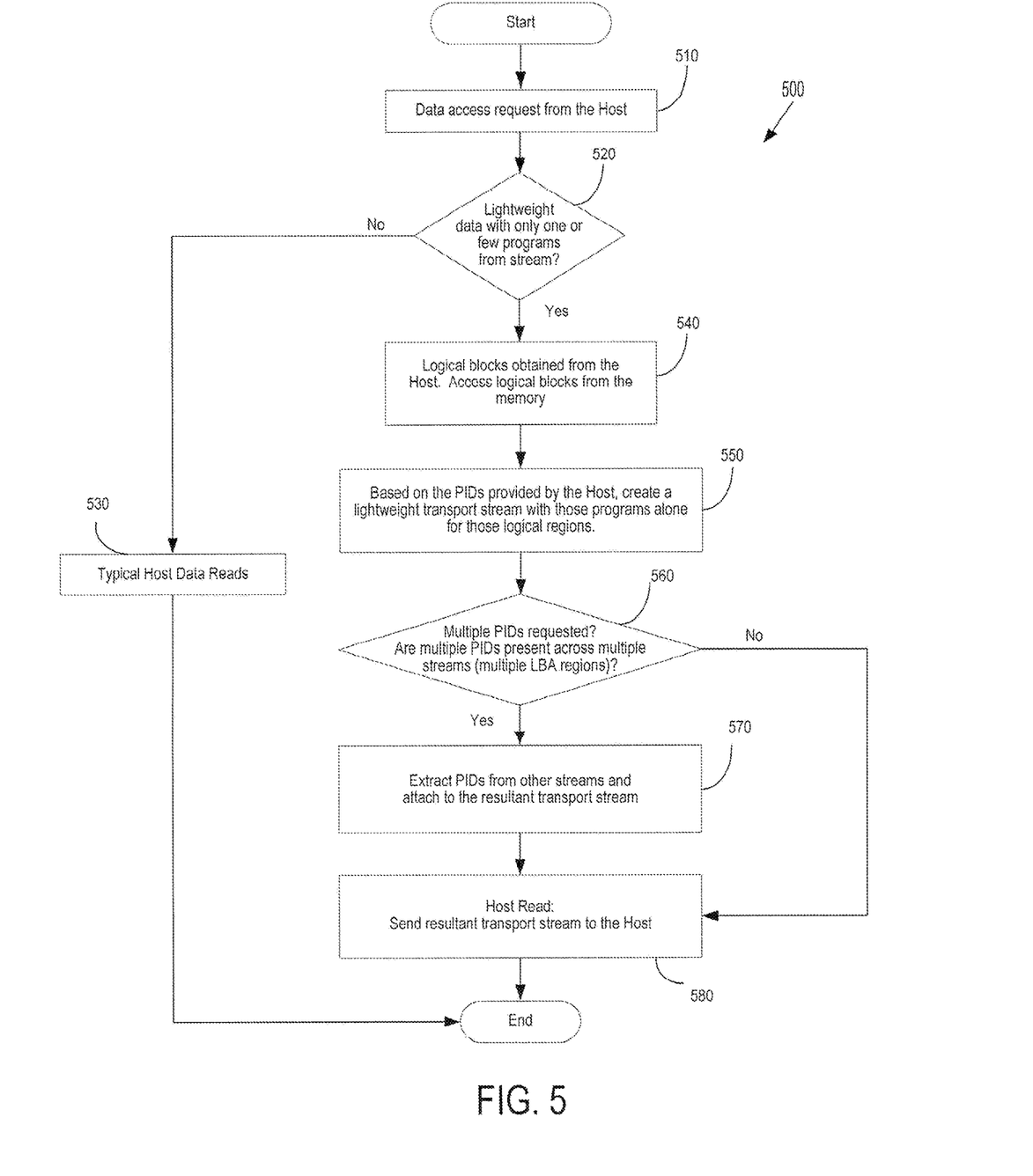
FIG. 5 is a flow chart of an application-defined data retrieval method of an embodiment

As shown in FIG. 5, in this example, after the data storage device 100 receives a request for data access from the host 300 (act 520), the controller 102 in the data storage device 100 determines if the host 300 is requesting a subset of the stored stream (act 520). If the host 300 is not requesting a subset, the controller 102 returns the entire video stream to the host 300 (act 530). However, if the host 300 is requesting a subset of the video stream (an application-specific storage interface can be used for the host to communicate the requested PIDs to the data storage device 100), the controller 102 reads the entire stream from the memory 104 (act 540) and creates a "lightweight" version of the stream with only the video content requested by the host 300 (act 550). To do this, the controller 102 retrieves the entire stored MPEG-TS from the memory 104 and creates a new MPEG-TS with only the requested video(s). The controller 102 can also create a modified program-specific program association table (PAT) or program mapping table (PMT) for the new MPEG-TS.

If the host 300 is requesting multiple videos from multiple streams (e.g., by requesting multiple PIDs) (act 560), the controller 102 can extract the PIDs from videos from the multiple streams (act 570) and send them to the host 300 (e.g., by creating a stream with the multiple videos) (act 580). By sending a lightweight MPEG-TS that comprises a subset of the videos contained in the original stream, less bandwidth is consumed. Also, removing unnecessary PIDs and enabling a lightweight playback content for multiple playback systems can optimize the infrastructure as a whole by providing less network usage and lesser device transfer latencies. That is, multiple playback systems may require mutually-exclusive PID playback. For example, the video needed for playback in a control room can be different than the video needed for playback in a manager's room. Parsing necessary PIDs for that playback requirement and enabling a lightweight playback content can optimize storage infrastructure as a whole. Further, these advantages may be even more appreciated when the network uses wireless data transfer.

There are several alternatives that can be used with these embodiments. For example, a faster, lower quality of service (QoS) access can be provided by retrieving and sending the host 300 only I-frames from a requested video program to minimize the data transfer requirements. In another alternative, the controller 102 can retrieve multiple programs from multiple streams (multiple MPEG-TSs) according to host requirements, combine the multiple programs into a new transport stream, and send the new transport stream to the host 300. In this way, the set of all the programs in the new transport stream is exactly what is needed by the host.

In another alternative, other forms of data other than video streams are used. For example, the stream can contain sensor data, and the host 300 may need data from only one or a few of the sensors for evaluation. The data storage device 100 can segregate data from the stored stream that relates to the relevant sensors (e.g., according to a host-provided configuration). This may be desired in a multi-channel or Internet of Things (IoT) system. In such system, a different transport packet can be used.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory; and
a controller configured to:
  receive video data from a plurality of cameras, wherein each camera of the plurality of cameras is associated with a different identifier;
  store, in the memory, a stream that combines the video data from the plurality of cameras;
  receive a request from a host for video data generated by a selected camera, wherein the request from the host comprises an identifier for the selected camera;
  extract, from the stored stream, the video data generated by the selected camera; and
  send the extracted video data to the host.

2. The data storage device of claim 1, wherein the identifier comprises a packet identifier (PID).

3. The data storage device of claim 1, wherein the controller is further configured to create a program association table for the extracted video data.

4. The data storage device of claim 1, wherein the controller is further configured to send only intra-coded picture frames (I-frames) from the extracted video data to the host.

5. The data storage device of claim 1, wherein the controller is further configured to:
  receive a request from the host for video data generated by another selected camera;
  extract the video data generated by the another selected camera; and
  send the extracted video data generated by the another selected camera to the host.

6. The data storage device of claim 5, wherein the video data generated by the another selected camera is extracted from the stream.

7. The data storage device of claim 5, wherein the video data generated by the another selected camera extracted from a different stream.

8. The data storage device of claim 5, wherein the extracted video data generated by the selected camera and the extracted video data generated by the another selected camera are combined into a transport stream.

9. The data storage device of claim 1, wherein the controller is further configured to receive the request via an application-specific storage interface.

10. The data storage device of claim 1, wherein the comprises a three-dimensional memory.

11. The data storage device of claim 1, wherein the controller is further configured to create a program mapping table for the extracted video data.

12. A method comprising:
performing the following in a data storage device comprising a memory:
  receiving video data from a plurality of cameras, wherein each camera of the plurality of cameras is associated with a different identifier;
  storing, in the memory, a stream that combines the video data from the plurality of cameras;
  receiving a request from a host for video data generated by a selected camera wherein the request from the host comprises an identifier for the selected camera;
  segregating the video data generated by the selected camera out of the stream; and
  sending the segregated video data to the host.

13. The method of claim 12, further comprising sending only intra-coded picture frames (I-frames) from the extracted video data to the host.

14. The method of claim 12, further comprising:
  receiving a request from the host for video data generated by another selected camera;
  segregating the video data generated by the another selected camera from the stream; and
  sending the segregated video data generated by the another selected camera to the host.

15. The method of claim 14, further comprising creating a transport stream with the segregated video data generated by the selected camera and the segregated video data generated by the another selected camera.

16. The method of claim 12, wherein the identifier comprises a packet identifier (PID).

17. The method of claim 12, further comprising:
  receiving a request from the host for video data generated by another selected camera;
  segregating the video data generated by the another selected camera from another stream stored in the memory; and
  sending the segregated video data generated by the another selected camera to the host.

18. The method of claim 17, further comprising creating a transport stream with the segregated video data generated by the selected camera and the segregated video data generated by the another selected camera.

19. The method of claim 12, wherein the request is received via an application-specific storage interface.

20. A data storage device comprising:
a memory;
means for storing, in the memory, a stream that combines video data from a plurality of cameras;
means for receiving a request from a host for video data generated by a selected camera;
means for extracting, from the stored stream, the video data generated by the selected camera; and
means for sending the extracted video data to the host.

* * * * *